United States Patent [19]

Iwai

[11] Patent Number: 4,641,020

[45] Date of Patent: Feb. 3, 1987

[54] OPTICAL HEAD POSITION CONTROL DEVICE

[75] Inventor: Nobuo Iwai, Yokohama, Japan

[73] Assignee: Alps Electric Co., Ltd., Japan

[21] Appl. No.: 635,261

[22] Filed: Jul. 27, 1984

[30] Foreign Application Priority Data

Jul. 28, 1983 [JP] Japan ............... 58-117784[U]

[51] Int. Cl.⁴ .............................. G01J 1/20
[52] U.S. Cl. ...................... 250/201; 369/45
[58] Field of Search ............. 250/201 DF, 201 AF, 250/201 R; 358/342; 369/44, 45, 46

[56] References Cited

U.S. PATENT DOCUMENTS

| | | | |
|---|---|---|---|
| 3,974,327 | 8/1976 | Van Dijk | 178/6.6 R |
| 4,032,776 | 6/1977 | Van Rosmalen | 250/201 |
| 4,504,938 | 3/1985 | Tajima | 369/45 |
| 4,546,460 | 10/1985 | Ando | 369/45 |

Primary Examiner—Edward P. Westin
Assistant Examiner—L. W. Modoo
Attorney, Agent, or Firm—Guy W. Shoup

[57] ABSTRACT

Disclosed is an improvement in an optical head-position control device in which focusing and tracking of an objective lens are effected by controlling a focus actuator and a tracking actuator on the basis of a detection signal of a light reception element which receives a laser beam reflected by an optical recording medium, the improvement being such that a sensor is provided for detecting the position of the objective lens and a negative feedback signal is superimposed onto a servo signal for the focus actuator and the tracking actuator on the basis of the detection signal from the objective lens detecting sensor to thereby improve the operation margin for the focus actuator and the tracking actuator.

4 Claims, 4 Drawing Figures

OPTICAL HEAD POSITION CONTROL DEVICE

BACKGROUND OF THE INVENTION

1. Field of the Invention

The present invention relates to an optical head position control device and particularly to an improvement in an optical head position control device in which focusing and tracking of an objective lens are effected by controlling a focus actuator and a tracking actuator on the basis of a detection signal of a light reception element which receives a laser beam reflected by an optical recording medium, the improvement being such that a sensor is provided for detecting the position of the objective lens and a negative feedback signal is superposed onto a servo signal for the focus actuator and the tracking actuator on the basis of the detection signal from the objective lens detecting sensor to thereby improve the operation margin for the focus actuator and the tracking actuator.

2. Description of Prior Art

As generally known, in an optical head, a laser is radiated onto an optical recording medium, such as a compact disk (hereinafter abbreviated as CD), so as to read out recorded information through the light reflected from the optical recording medium. The optical head is provided with a tracking mechanism for tracing a predetermined record track on the CD and a focusing mechanism for adjusting focus to cope with surface swing of the CD.

The tracking mechanism is provided with a radial drive mechanism for displacing the whole of the optical head by a motor drive and a tracking servo mechanism for finely displacing only the objective lens. The tracking servo mechanism is provided because the radial drive mechnism has a large inertia so that it can not move rapidly. The focusing mechanism is provided for verticaly displacing the objective lens so that the reflection plane of the CD is always within the depth of field, because the surface of the CD swings more or less due to warp thereof or the like. The optical head position control device according to the present invention is intended to control the objective lens position which is moved by the tracking servo mechanism and the focusing mechanism.

Referring to FIG. 1, a conventional optical head position control device is described. FIG. 1 is an explanatory diagram with respect to a focus servo in an conventional optical head position control device. In the drawing, reference numeral 1 designates a CD, 2 an optical head, 3 an objective lens, 4 a focus actuator, 5 a beam splitter, 6 a laser diode, 7 a PIN photodiode, 8 a focus error signal detecting circuit, 9 a phase correction circuit, and 10 an actuator drive circuit. As to the optical head 2, only the portions necessary for explaining the focus servo operation is briefly illustrated.

In FIG. 1, a laser beam emitted from the laser diode 6 is radiated onto the CD 1. A beam image reflected from CD 1 is received by the PIN photodiode 7 through the objective lens 3 and the beam splitter 5. Based on the output of the PIN photodiode 7, a focus error is detected by the focus error signal detecting circuit 8. The detection signal produced from the focus error signal detecting circuit 8 is then subject to phase correction in the phase correction circuit 9. Based on the correction signal produced by the phase correction circuit 9, the actuator drive circuit 10 controls the focus actuator 4 to adjust focusing of the objective lens 3. The tracking servo in the conventional optical head position control device is also performed in the same manner as described above as to the focus servo.

As generally known, the characteristic of an actuator is non-linear due to abrasion or play at a sliding portion thereof, influence of hysteresis, or the like. Further, variations in characteristic may occur in each actuator and variations in sensitivity and in resonance frequency may also exist among individual actuators. Accordingly, the conventional optical head position control device has a drawback that an increase in focus errors as well as tracking errors, deterioration in phase margin as well as gain margin, and variations in control characteristic may occur due to changes in temperature and humidity, or the like. Thus, conventionally, it has been intended to improve the characteristic of parts used and the structure of actuators to thereby improve the above-mentioned undesirable characteristics. Accordingly, the conventional device has a defect that the manufacturing cost is high.

SUMMARY OF THE INVENTION

An object of the present invention is to eliminate the above-mentioned drawbacks in the prior art.

Another object of the present invention is to provide an optical head position control device in which a sensor is provided for detecting the position of an objective lens and a negative feedback signal is superposed onto a servo signal for a focus actuator and a tracking actuator on the basis of a detection signal from the objective lens detecting sensor to thereby improve the undesirable characteristics of the actuators to make it possible to achieve accurate tracking and focusing.

Other objects and advantages of the present invention will be apparent from the following description taken in connection with the accompanying drawings.

PREFERRED EMBODIMENTS OF THE INVENTION

Figure 1:
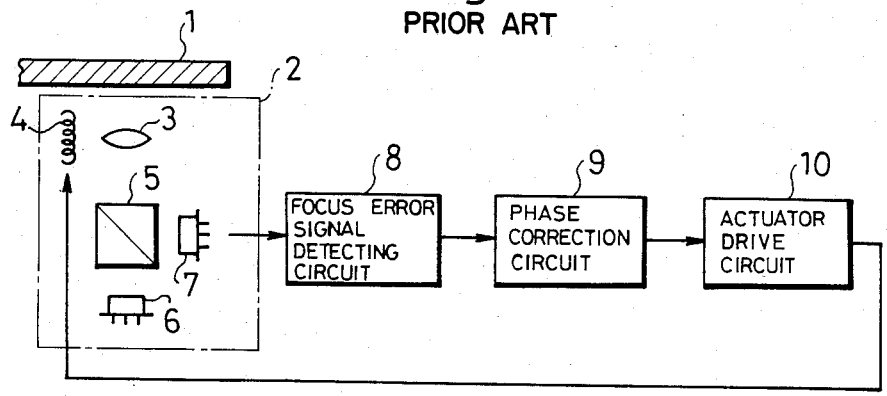
FIG. 1 is a block diagram showing the basic arrangement of the conventional optical head position control device.

Referring to the drawings, preferred embodiments of the invention will be described hereunder.

Figure 2:
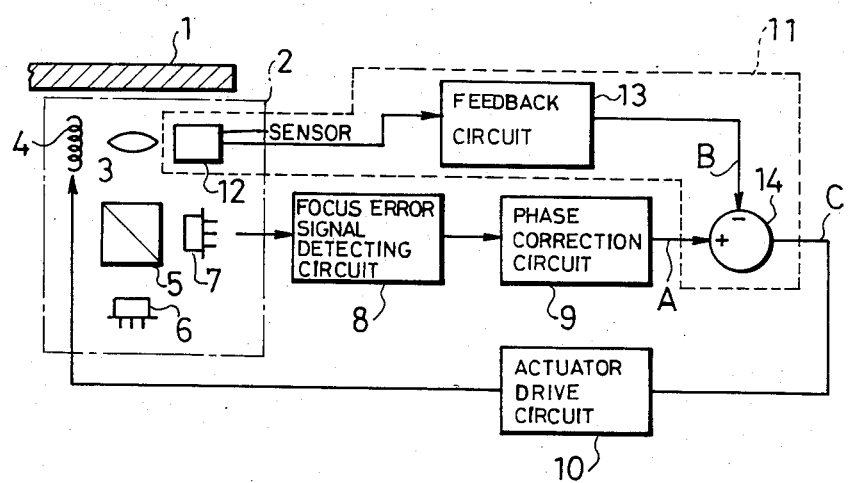
FIG. 2 is a block diagram showing the basic arrangement of an embodiment of the focus servo mechanism according to the present invention.

In an embodiment shown in FIG. 2, the reference numerals 1 to 10 designate the same components as those designated by the same numerals in FIG. 1, while the reference numerals 11, 12, 13, and 14 designate a negative feedback circuit section, an objective lens focal position sensor, a feedback circuit, and an adder respectively.

Figure 3:
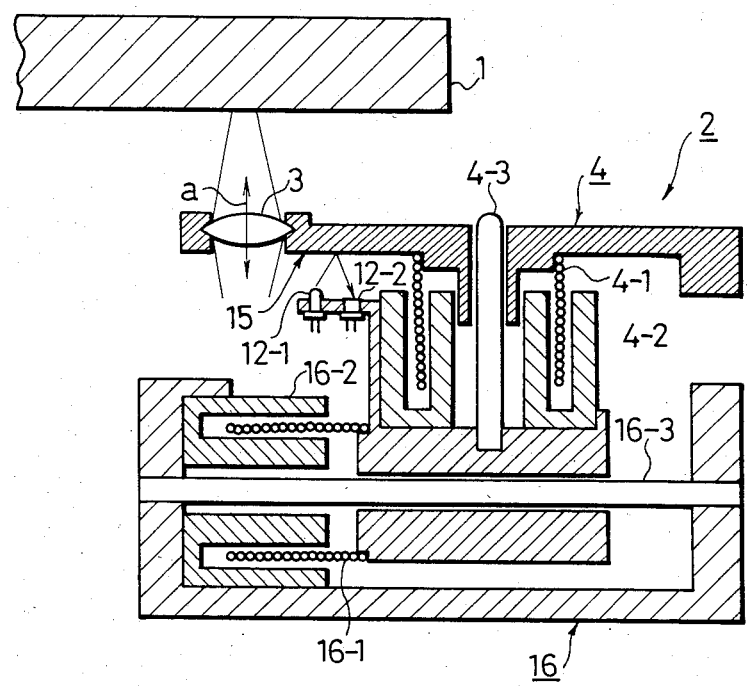
FIG. 3 is a cross-section of a part of the optical head, for explaining an embodiment of the objective lens focal position sensor used in the present invention.
Figure 4:
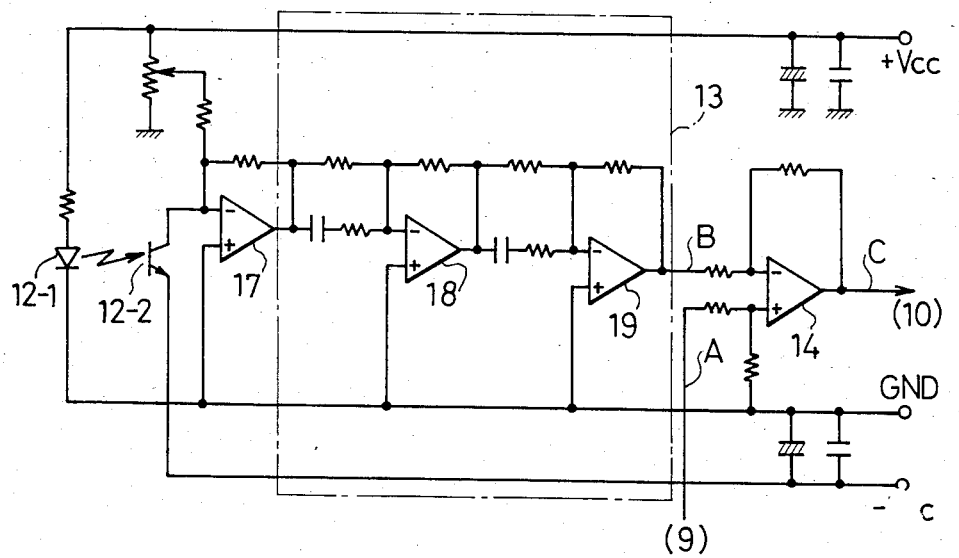
FIG. 4 is a detailed circuit diagram of the negative feedback circuit section in the embodiment shown in FIG. 2.

In the embodiment as shown in FIG. 2, the objective lens focal position sensor 12 for detecting the position of the objective lens in the focusing direction is provided and a negative feedback signal is superposed onto a control signal A for the focus actuator 4 on the basis of a detection signal from the objective lens focal position sensor 12 to thereby improve the undesirable charateristics of the actuator as described above. Referring to FIGS. 3 and 4, the embodiment will be described more in detail.

FIG. 3 is a cross-section of a part of the optical head 2, for explaining an embodiment of the objective lens focal position sensor 12 as shown in FIG. 2. In FIG. 3, the reference numerals 1 to 4 designate the same components as those designated by the same numerals in FIG. 2, while the reference numeral 4-1 designates a focusing coil, 4-2 a focus control magnetic flux generating section, 4-3 a focus actuator shaft, 12-1 a light emission diode, 12-2 a phototransistor, 15 a reflection plane, 16 a tracking actuator, 16-1 a tracking coil, 16-2 a tracking control magnetic flux generating section, and 16-3 a tracking actuator shaft. Further, FIG. 3 is a cross-section of the actuator portion of the optical head 2 in order to explain an embodiment of the objective lens focal position sensor 12 according to the present invention. Upon application of a control signal to the focusing coil 4-1 from the actuator drive circuit 10 of FIG. 2, the objective lens 3 is driven in the direction of arrow a in the drawing or the focusing direction. The reflection plane 15 also moves up/down corresponding to the movement of the objective lens 3 in the focusing direction. As a result, the reflection point of the light radiated from the light emission diode 12-1 moves on the reflection plane 15, and the amount of light reception of the phototransistor 12-2 changes corresponding to the displacement of the objective lens 3. That is, the position of the objective lens 3 is detected on the basis of the output of the phototransistor 12-2.

FIG. 4 is a detailed circuit diagram of the negative feedback circuit section 11 including the objective lens focal position sensor 12 shown in FIG. 2. In FIG. 4, the reference numerals 13 and 14 designate the same components as those designated by the same numerals in FIG. 2 and 12-1 and 12-2 designate the same components as those designated by the same numerals in FIG. 3, while the reference numerals 17 to 19 designate amplifiers respectively. As described above by referring to FIG. 3, the output of the phototransistor 12-2 corresponds to the position of the objective lens 3 in the focusing direction. An output A of the phase correction circuit 9 of FIG. 2 is applied to the adder 14. Thus, in the adder 14, the output A of the phase correction circuit 9 is superposed on the negative feedback signal B which is obtained by amplifying the output of the phototransistor 12-2 through the amplifiers 17 to 19. That is, the feedback signal B corresponding to the position of the objective lens 3 is superposed on the control signal for the focus actuator 4 which is produced on the basis of the output on the PIN photodiode 7. Thus, an increase in focusing and tracking errors can be corrected by the negative feedback signal B indicating the position of the objective lens 3, so that the above-described undesirable characteristic of the focus actuator 4 is remarkably improved to make it possible to largely reduce the bad influence on focusing.

Although description has been made above as to the focusing system in the optical head position control device according to the present invention, the same applies also to the tracking system. The objective lens position detecting sensor is not limited to that illustrated in the embodiment of FIG. 3 but it is a matter of course that those of any other type generally known as such a position sensor can be used in the present invention.

As described above, according to the present invention, an optical head position control device can be provided in which it is made possible to largely reduce the bad influence due to the undesirable characteristics of the actuators so that the tracking servo as well as the focusing servo can be achieved accurately with a low cost.

I claim:

1. In an optical head position control device for controlling the position of an optical head emitting a source beam and receiving a reflected beam image from a surface of an optical storage medium, said device comprising an objective lens for transmitting the source beam to the surface of the medium and for receiving the reflected beam image, a tracking actuator for driving the objective lens in a radial tracking direction, and a focusing actuator for driving the objective lens in a focusing direction, said focusing actuator being controlled on the basis of a focus error detecting circuit which detects focus error from said reflected beam image and provides an output control signal to said focusing actuator, the improvement in which said device further comprises:
    an objective lens focal position sensor for detecting the position of said objective lens in the focusing direction, and
    a focusing feedback circuit for producing a focusing negative feedback signal on the basis of a detection signal from said objective lens focal position sensor,
    said focusing negative feedback signal being superposed on said output control signal for said focusing actuator.

2. An optical head position control device according to claim 1, in which said objective lens focal position sensor comprises a light emission diode and a phototransistor.

3. In an optical head position control device for controlling the position of an optical head emitting a source beam and receiving a reflected beam image from a surface of an optical storage medium, said device comprising an objective lens for transmitting the source beam to the surface of the medium and for receiving the reflected beam image, a tracking actuator for driving the objective lens in a radial tracking direction, and a focusing actuator for driving the objective lens in a focusing direction, said tracking actuator being controlled on the basis of a tracking error detecting circuit which detects tracking error from said reflected beam image and provides an output control signal to said tracking actuator, the improvement in which said device further comprises:
    an objective lens radial position sensor for detecting the position of said objective lens in the radial direction, and
    a tracking feedback circuit for producing a tracking negative feedback signal on the basis of a detection signal from said objective lens radial position sensor,
    said tracking negative feedback signal being superposed on said output control signal for said tracking actuator.

4. An optical head position control device according to claim 3, in which said objective lens radial position sensor comprises a light emission diode and a phototransistor.

* * * * *